United States Patent
Zhang et al.

(10) Patent No.: US 10,817,417 B1
(45) Date of Patent: Oct. 27, 2020

(54) DATA STORAGE EFFICIENCY USING STORAGE DEVICES WITH VARIABLE-SIZE INTERNAL DATA MAPPING

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 0 days.

(21) Appl. No.: 16/441,693

(22) Filed: Jun. 14, 2019

(51) Int. Cl.
*G06F 13/00* (2006.01)
*G06F 12/02* (2006.01)
*G06F 3/06* (2006.01)
*G06F 12/06* (2006.01)

(52) U.S. Cl.
CPC ........ *G06F 12/0246* (2013.01); *G06F 3/0608* (2013.01); *G06F 3/0644* (2013.01); *G06F 3/0679* (2013.01); *G06F 12/0292* (2013.01); *G06F 12/0646* (2013.01)

(58) Field of Classification Search
CPC ............. G06F 12/0246; G06F 12/0292; G06F 12/0646; G06F 3/0608; G06F 3/0644; G06F 3/0679
See application file for complete search history.

(56) References Cited

U.S. PATENT DOCUMENTS

2017/0068472 A1\* 3/2017 Periyagaram ......... G06F 3/0619

\* cited by examiner

*Primary Examiner* — Sean D Rossiter
(74) *Attorney, Agent, or Firm* — Hoffman Warnick LLC

(57) ABSTRACT

An infrastructure and method for storing compressed data. On a host, a data zero forcing system causes an unused portion at a tail end of a data sector to be forced to all zeros before being written. On a storage device comprising solid state memory, a zero tail detection system detects and removes a tail end of zeros in the data sector to create a variable size data chunk, and allocates a segment for storing the variable size data chunk. A variable size mapping system is provided that includes: a mapping table that maps a logical block address (LBA) of the variable size data chunk to a physical block address (PBA) entry, wherein the PBA entry includes a segment ID and an index; and a segment utilization table which, for each of a plurality of segments, provides a size of each variable size data chunk stored in the segment.

20 Claims, 10 Drawing Sheets

DATA STORAGE EFFICIENCY USING STORAGE DEVICES WITH VARIABLE-SIZE INTERNAL DATA MAPPING

TECHNICAL FIELD

The present invention relates to the field of data storage, and particularly to improving the data storage efficiency by leveraging data lossless compressibility.

BACKGROUND

Many real-life applications have a high degree of lossless data compressibility. Therefore, data compression is being widely used in computing systems in order to improve the data storage efficiency. Data compression can be realized at either the application level or the filesystem level. Applications such as databases can explicitly compress the data on their own before writing their data to the underlying storage devices. Filesystems such as ZFS and Btrfs can compress data transparently to upper-level applications, which is referred to as transparent filesystem data compression. In many scenarios (e.g., database and filesystem), data is compressed and stored with a relatively small granularity such as 16 kB, i.e., each 16 kB chunk of data is compressed and stored to the storage device individually and independently from other data chunks.

Modern data storage devices typically use an I/O interface protocol with the sector size of 4 kB, i.e., host writes/reads data to/from storage devices in the unit of 4 kB sectors. Hence, each compressed data chunk has to be transferred to the storage device with the unit of 4 kB sectors. As a result, each compressed data chunk always occupies one or multiple of 4 kB sectors in the underlying storage device. The mismatch between the variable-length compression result and 4 kB-aligned storage leads to a non-negligible amount of storage space waste. For example, if one 16 kB data chunk is compressed to 9 kB, the compressed data chunk of 9 kB has to occupy three 4 kB sectors (i.e., 12 kB) in the storage device. This leads to a waste of 3 kB storage capacity. Therefore, it is highly desirable to eliminate such storage space waste to improve the storage efficiency, especially for high-cost storage devices such as solid-state drives (SSDs).

Due to the additional computational complexity and latency caused by compression, some applications may not always turn on compression even in the presence of good data compressibility, especially for latency-sensitive applications such as a database. In order to reduce the data storage management complexity, some applications (in particular a database) typically manages data in the unit of page (e.g., 8 kB or 16 kB per page) and do not fully fill each page. For example, the database MySQL by default manages data storage in units of a 16 kB page. Controlled by a parameter called fill-factor $\alpha$ (where $0<\alpha\leq1$), MySQL may fill up to $\alpha\cdot16$ kB when creating a new 16 kB page so that it could directly insert new data items to the page in the future without complicating the data storage management. Although a smaller value of the fill-factor $\alpha$ could reduce the data management complexity, it nevertheless causes higher storage space usage, especially when data compression is not being used. It is highly desirable to reduce the actual storage space usage in the presence of a small fill-factor.

SUMMARY

Accordingly, embodiments of the present disclosure are directed to systems and methods for improving data storage efficiency by using solid-state data storage devices with flexible internal data mapping.

A first aspect provides a storage infrastructure, comprising: a data zero forcing system adapted to interact with an application running on a host, wherein the data zero forcing system causes an unused portion at a tail end of a data sector to be forced to all zeros before being written; a storage device comprising solid state memory adapted to store and retrieve data written by the host, wherein the storage device includes: a zero tail detection system which, in response to receiving a write request for a data sector, detects and removes a tail end of zeros in the data sector to create a variable size data chunk, and allocates a segment for storing the variable size data chunk; and a variable size mapping system that includes: (1) a mapping table that maps a logical block address (LBA) of the variable size data chunk to a physical block address (PBA) entry, wherein the PBA entry includes a segment ID and an index; and (2) a segment utilization table which, for each of a plurality of segments, provides a size of each variable size data chunk stored in the segment.

A second aspect provides a method of processing data in a storage infrastructure, comprising: in response to a request to write compressed data to a storage device from an application running on a host, packaging the compressed data into a set of sectors; determining if there exists an unused portion at a tail end of a sector; in response to a detection of an unused portion at the tail end of a sector, forcing the unused portion to all zeros; receiving at a storage device the set of sectors; examining each sector to detect if a tail end of zeros exists; if a tail end of zeros exists, removing the zeros create a variable size data chunk; allocating a segment for storing the variable size data chunk; and updating a mapping table that maps a logical block address (LBA) of the variable size data chunk to a physical block address (PBA) entry, wherein the PBA entry includes a segment ID and an index; and updating a segment utilization table which, for each of a plurality of segments, provides a size of each variable size data chunk stored in the segment.

A third aspect provides a data storage device comprising: a solid state memory that stores data in segments; and a controller that manages read and write requests from a host, wherein the controller includes: a zero tail detection system which, in response to receiving a write request for a data sector, detects and removes a tail end of zeros in the data sector to create a variable size data chunk, and allocates a segment for storing the variable size data chunk; and a variable size mapping system that includes: (1) a mapping table that maps a logical block address (LBA) of the variable size data chunk to a physical block address (PBA) entry, wherein the PBA entry includes a segment ID and an index; and (2) a segment utilization table which, for each of a plurality of segments, provides a size of each variable size data chunk stored in the segment.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
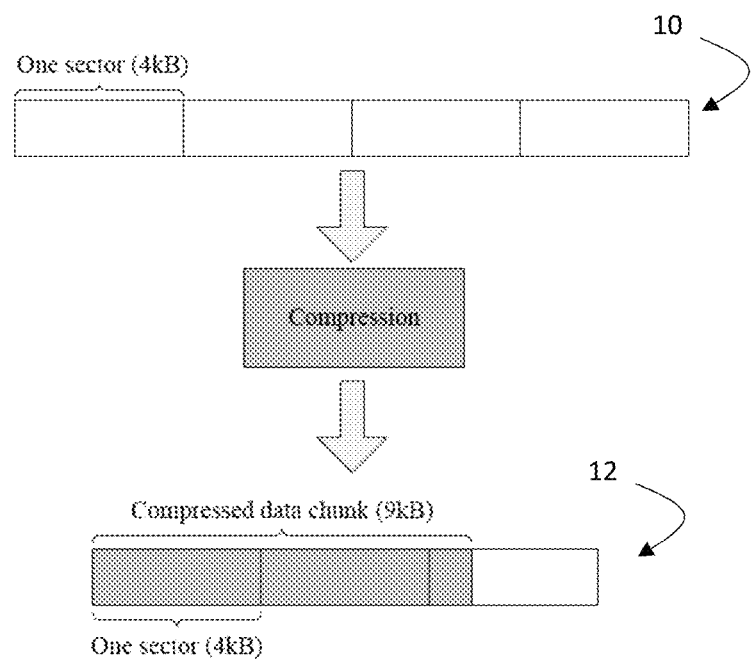
FIG. 1 illustrates the packing of a compressed result into one or multiple sectors.

As noted above, current data compression approaches often lead to ineffective results. For instance, as illustrated in FIG. 1, for a sector size of 4 kB, if one 16 kB data chunk 10 is compressed to 9 kB, the compressed data chunk of 9 kB has to occupy three sectors (i.e., 12 kB) 12 in the storage device. This leads to a waste of 3 kB storage capacity. As a result, if compression cannot reduce the data chunk size by at least one sector, data compression will not lead to any storage space saving. Hence, applications/filesystems typically keep the original uncompressed data chunk if compression cannot reduce the data chunk size by at least one sector.

Figure 2:
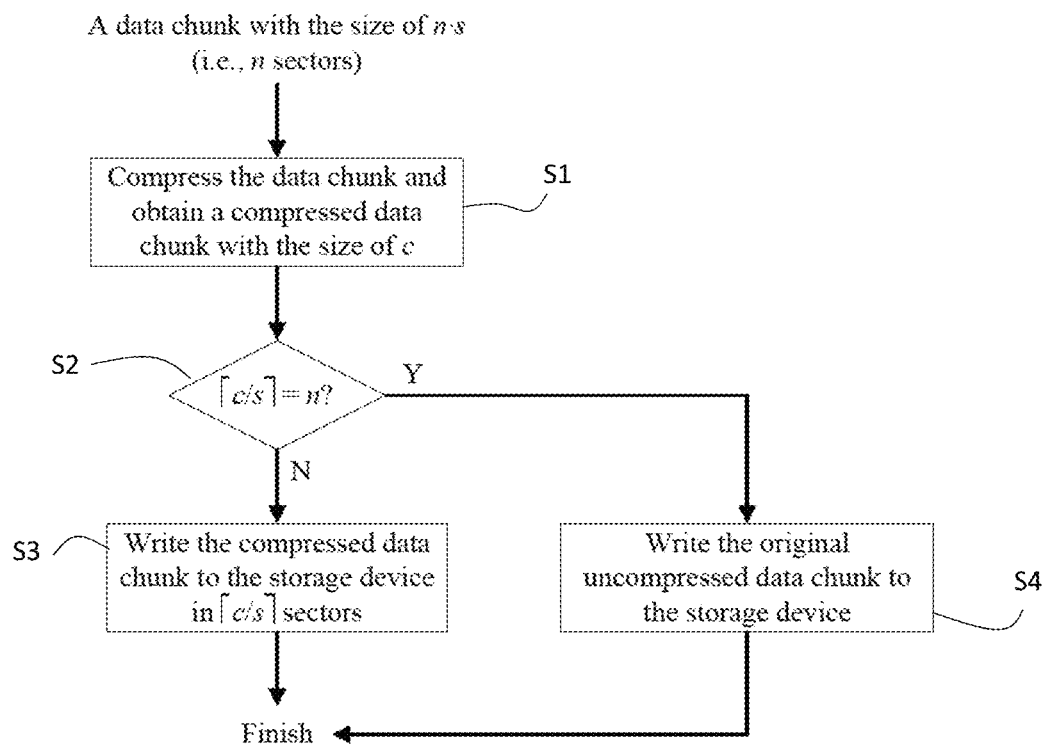
FIG. 2 illustrates the operational flow diagram of data compression of applications/filesystems in current practice.

FIG. 2 illustrates the operational flow diagram of data compression of applications/filesystems in current practice. Assume the size of each original uncompressed data chunk is equal to the size of n (e.g., 2 or 4) sectors. Let s denote the sector size (e.g., 4 kB), and c (e.g., 11 kB) denote the size of the compressed data chunk. At S1, before writing each data chunk to the storage device, the application or filesystem first applies a chosen algorithm (e.g., lz4, Snappy, zlib, etc.) to compress the data chunk. If $\lceil c/s \rceil$ equals n (i.e., requires n sectors) at S2, the compressed data chunk will occupy the same n sectors as the original uncompressed data chunk. Hence, if yes at S2, then at S4 the application/filesystem should simply write the original uncompressed data chunk to the storage device (i.e., abandon the compressed data chunk). If $\lceil c/s \rceil < n$, then the application/filesystem can write the compressed data chunk to the storage devices in $\lceil c/s \rceil$ sectors at S3.

Figure 3:
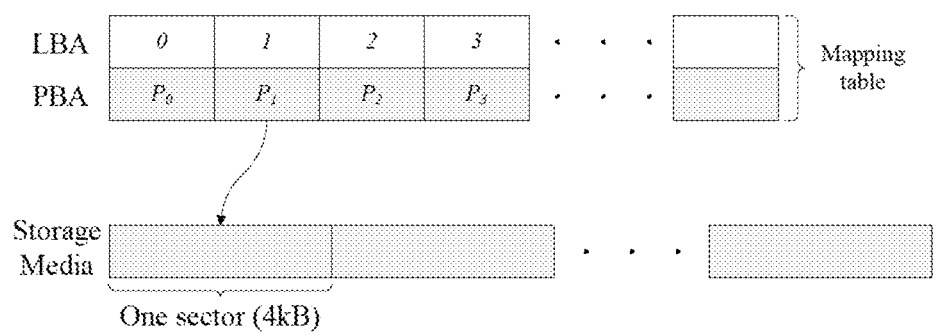
FIG. 3 illustrates the LBA-PBA mapping in current storage devices.

Solid-state drives (SSDs) expose an array of logical block addresses (LBAs) to the host through standard I/O interface protocol (e.g., SATA and NVMe), and each LBA associates with a storage space of a sector (e.g., 4 kB). SSDs internally manage the mapping of LBA onto the physical storage media (e.g., flash memory chips). In conventional practice, the physical storage media inside SSDs are partitioned into constant-size storage units, and the size of each unit is equal to the sector size. As illustrated in FIG. 3, SSDs assign each internal storage unit with one unique physical block address (PBA), and internally manage/maintain an injective mapping between LBA and PBA. The software component inside SSDs responsible for managing the LBA-PBA mapping is called the flash translation layer (FTL).

Figure 4:
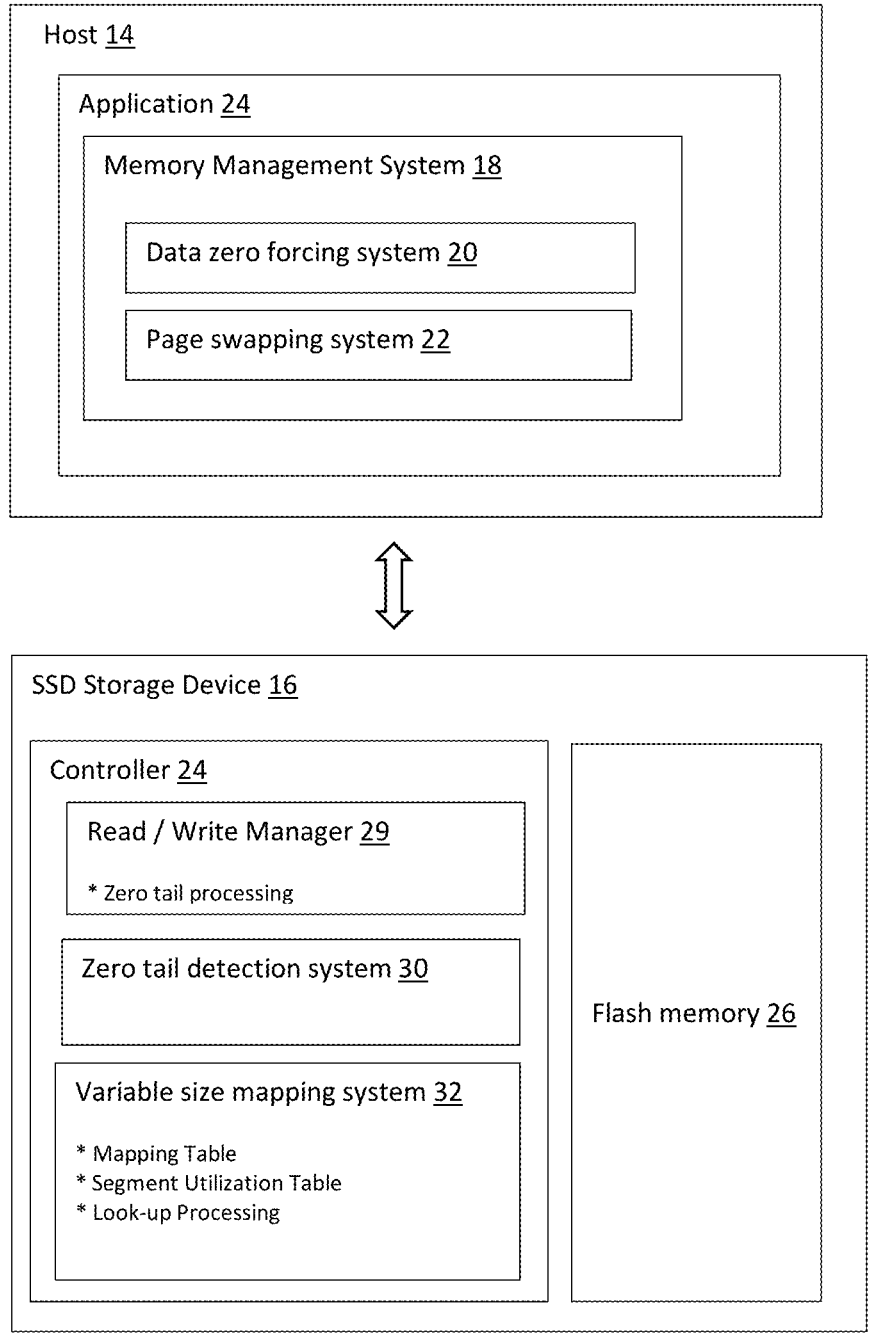
FIG. 4 illustrates a storage infrastructure, in accordance with embodiments.

FIG. 4 depicts an illustrative storage infrastructure having a host 14 and a SSD storage device 16 configured to improve data storage efficiency when using SSDs (such as flash memory 26) with compression. In particular, the present solution exploits unused sector portions resulting from compression on the host 14 and allows for variable sized storage blocks on the storage device 16. In the example shown, an application 24 (which may for example comprise a file system, a database, or any other system that handles data) includes a memory management system 18 adapted to interact with the application. Memory management system may for example be instrumented as a plug-in, a library, a component of the application itself, etc. In this embodiment, memory management system 18 includes a data zero forcing system 20 and a page swapping system 22, which are described in detail below.

Storage device 16 generally includes a controller 24 and solid state storage such as flash memory 26. Controller 24 handles the storage and retrieval of data in response to write and read commands from the host 14. In this illustrative embodiment, controller 24 includes a read/write manager 29, a zero tail detection system 30, and a variable size mapping system 32, which are likewise described in detail below.

Figure 5:
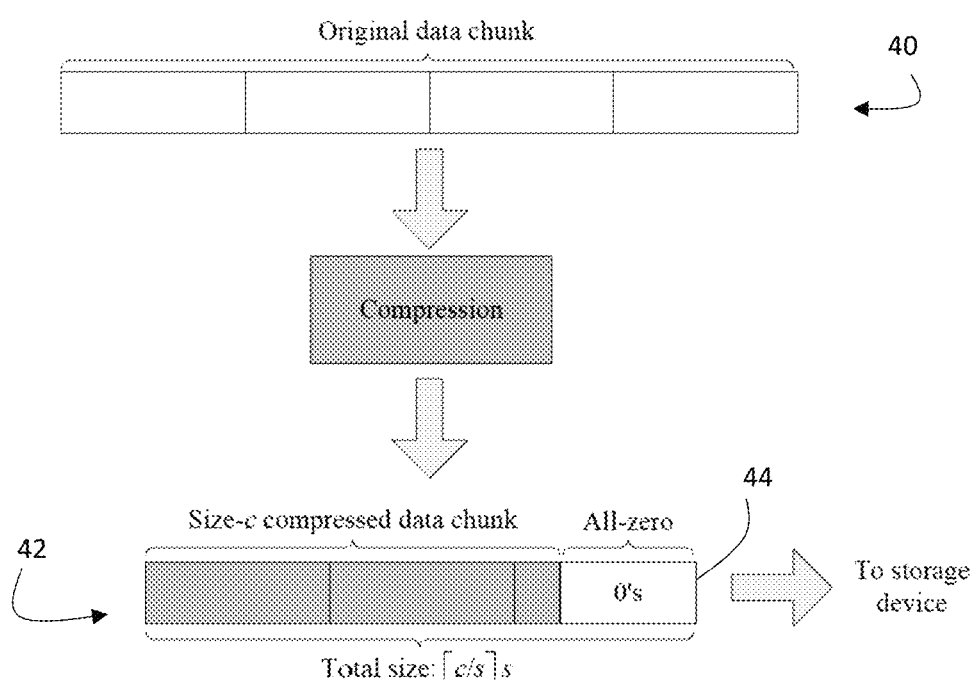
FIG. 5 illustrates data zero forcing when packing compressed results into one or multiple sectors, in accordance with embodiments.

In order to reduce the storage space waste when the application 24 uses data compression as discussed above, memory management system 18 includes a data zero forcing system 20 which converts unused sector space at the tail end of data being written to storage device 16 to all zeros. As noted, when the application 24 writes a compressed data chunk to the storage device 16, the application 24 packs the compressed data chunk into one or multiple sectors. An example of this is shown in FIG. 5, in which an original data chunk 40 is compressed into a compressed data chunk 42 having all zeros in the unused portion of the tail sector 44. In this case, s denotes the sector size, and c denotes the size of the compressed data chunk 42. The compressed data chunk will be packed into $\lceil c/s \rceil$ sectors, in which the compressed data chunk occupies a storage space of c and the remaining storage space of $\lceil c/s \rceil \cdot s - c$ is not used. Instead of leaving the content of the unused storage space of $\lceil c/s \rceil \cdot s - c$ as random garbage, data zero forcing system 20 forces the content to all zeros.

Referring again to FIG. 4, when the read/write manager 29 on the storage device 16 receives a write request, a zero tail detection system 30 detects when a data sector being written to memory includes an all-zero tail. Accordingly each sector being transferred from the host 14 to storage device 16 is examined to detect the existence and length of an all-zero tail in each sector.

Figure 6:
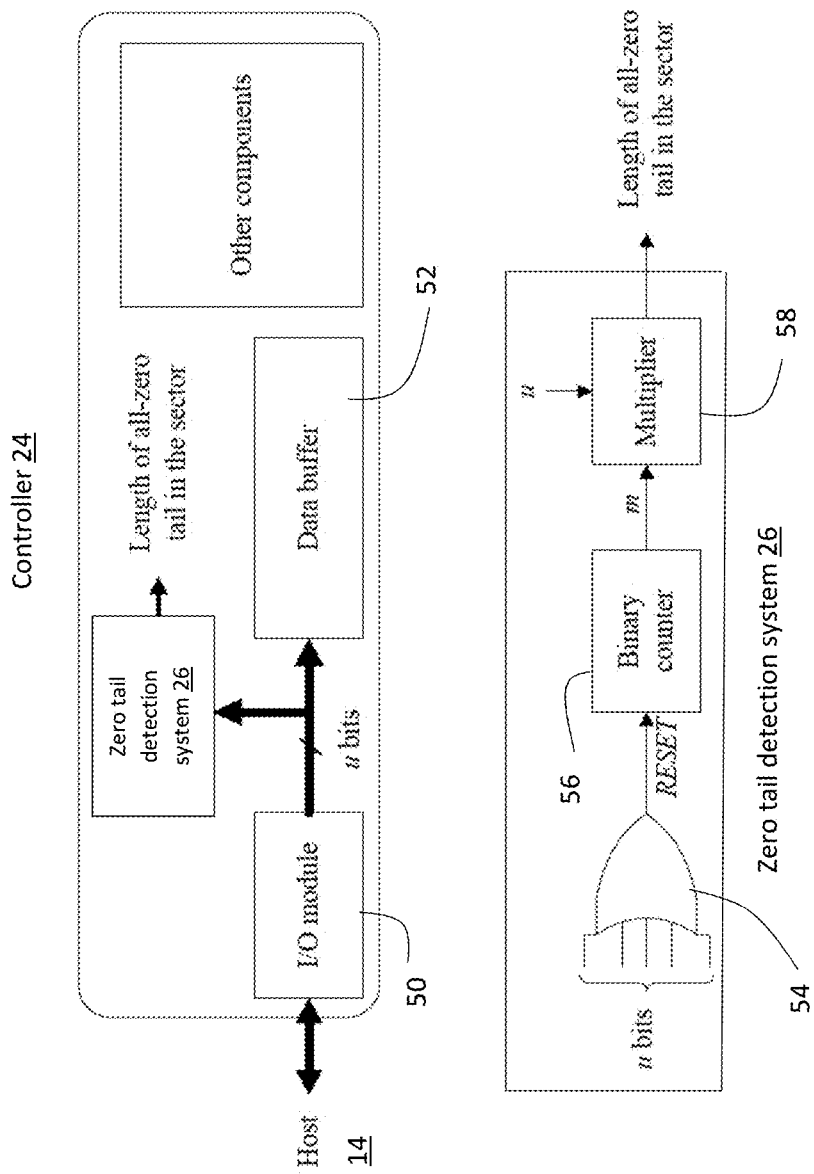
FIG. 6 illustrates the design of the all-zero tail detection in a storage device controller, in accordance with embodiments.

Although any technique may be utilized to detect the all-zero tail, FIG. 6 depicts an illustrative embodiment that minimizes the latency overhead induced by the zero-detection operation. As illustrated, inside controller 24, an I/O module 50 receives the incoming data from the host 14, and transfers the data to an internal data buffer 52. As illustrated, the zero tail detection system 30 is implemented in parallel with the data buffer 52 to detect the existence and length of the all-zero tail in each sector. Right after the I/O module 50 receives and transfers one sector completely to the buffer, the zero tail detection system 26 will complete the detection of the length of the all-zero tail in the sector (if it exists). Hence, such a detection operation will not incur any latency overhead.

FIG. 6 also illustrates an example circuit implementation of the zero tail detection system 30 that includes a logical OR gate 54, a binary counter 56 and a multiplier 58. Assume the I/O module 50 transfers u bits per clock cycle to the data buffer 52 and the zero tail detection system 30 receives u bits per clock cycle. During each clock cycle, all the u bits feed to the input of the OR gate 54. The output of the OR gate 54 is 1 only when all the u input bits are zero. The OR gate output connects to the "RESET" input of the binary counter 56 and when the "RESET" input is 0, the binary counter increments the output by 1 each clock cycle. When the "RESET" input is 1, the binary counter 56 resets its output to 0. After the I/O module 50 finishes transferring one entire sector to the data buffer 52, the output of the binary counter 56 is used to obtain the length of the all-zero tail in the sector, i.e., let m denote the output of the binary counter 56, where the length of the all-zero tail in the sector is calculated as u·m. Once calculated, the all-zero tail is removed before being stored in flash memory 26.

To further enhance the approach, variable size mapping system 32 (FIG. 4) allows PBAs to be associated with different storage sizes on the physical storage media, i.e., variable size data chunks. As described above, in prior practice, all the PBAs inside flash memory 26 associate with the same physical storage capacity, which is equal to the sector size of each LBA.

Figure 7:
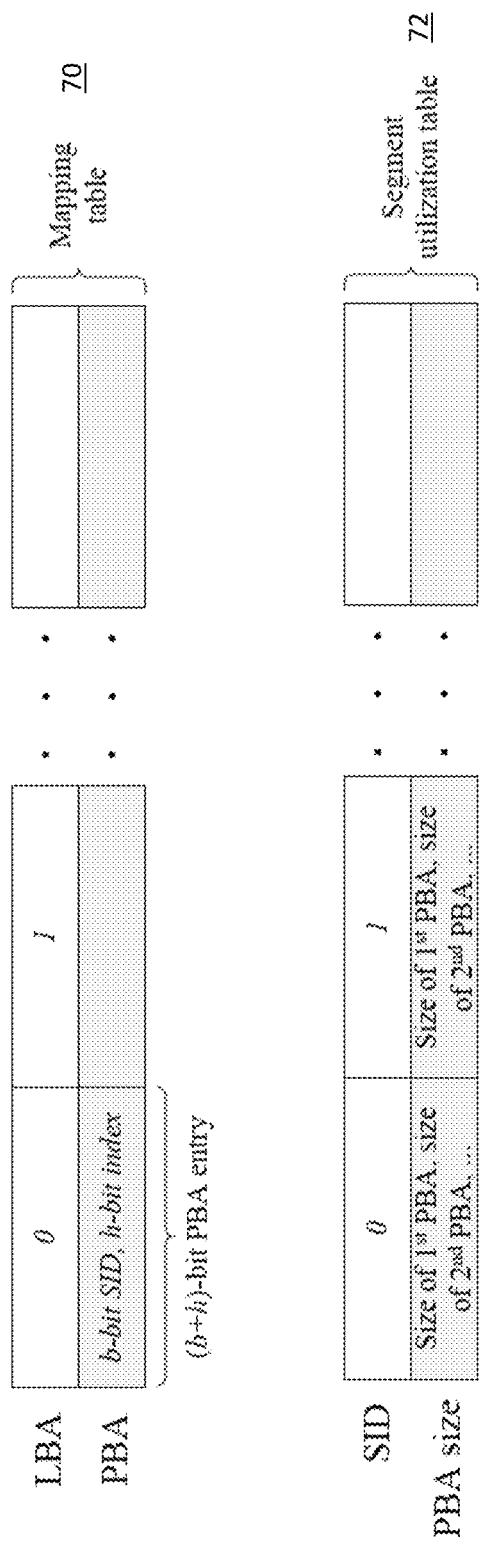
FIG. 7 illustrates the LBA-PBA mapping table and segment utilization mapping table in support of variable-size data mapping, in accordance with embodiments.

The variable size mapping system 32 allows for variable size data chunks by implementing an LBA/PBA mapping table 70 and a segment utilization table 72, as shown by way of example in FIG. 7. In this illustrative example, let s denote the sector size (e.g., 4 kB) and d denote the length of the all-zero tail in a sector. Internally, the storage device 16 will map each sector to a PBA entry with the storage capacity of s–d, i.e., the all-zero length-d tail in the sector is not physically stored. To facilitate practical realization of such mapping between constant-size LBA and variable-size PBA, mapping system 32 may utilize the following technique. Storage device 16 internally partitions its internal physical storage media (e.g., flash memory 26) into multiple equal-size segments. Let v denote the capacity of each segment (e.g., 32 kB or 128 kB), which is a multiple of sector size (e.g., 4 kB). Each segment is assigned a unique segment ID. Each segment stores the data associated with multiple variable size PBAs (i.e., "variable size data chunks"). Assume each segment ID is represented with b bits and each segment can store data for at most $2^h$ PBA data chunks. As illustrated in FIG. 7, in the LBA-PBA mapping table 70, each PBA entry contains two parts: (1) the b-bit segment ID (SID) of the segment to which the PBA belongs, and (2) the h-bit intra-segment index. In addition, storage device 16 maintains another table called the segment utilization table 72, which stores the size of all the PBA being stored in each segment.

Upon a read request on one LBA, the controller 24 (FIG. 4) can obtain the physical location of the data being requested as follows. First, the LBA-PBA mapping table 70 is checked to obtain the corresponding segment ID and intra-segment index. Next, the segment utilization table 72 is checked to calculate the location and size of the PBA. The data corresponding with the identified location/size can then be read out and returned to the host 14.

Figure 8:
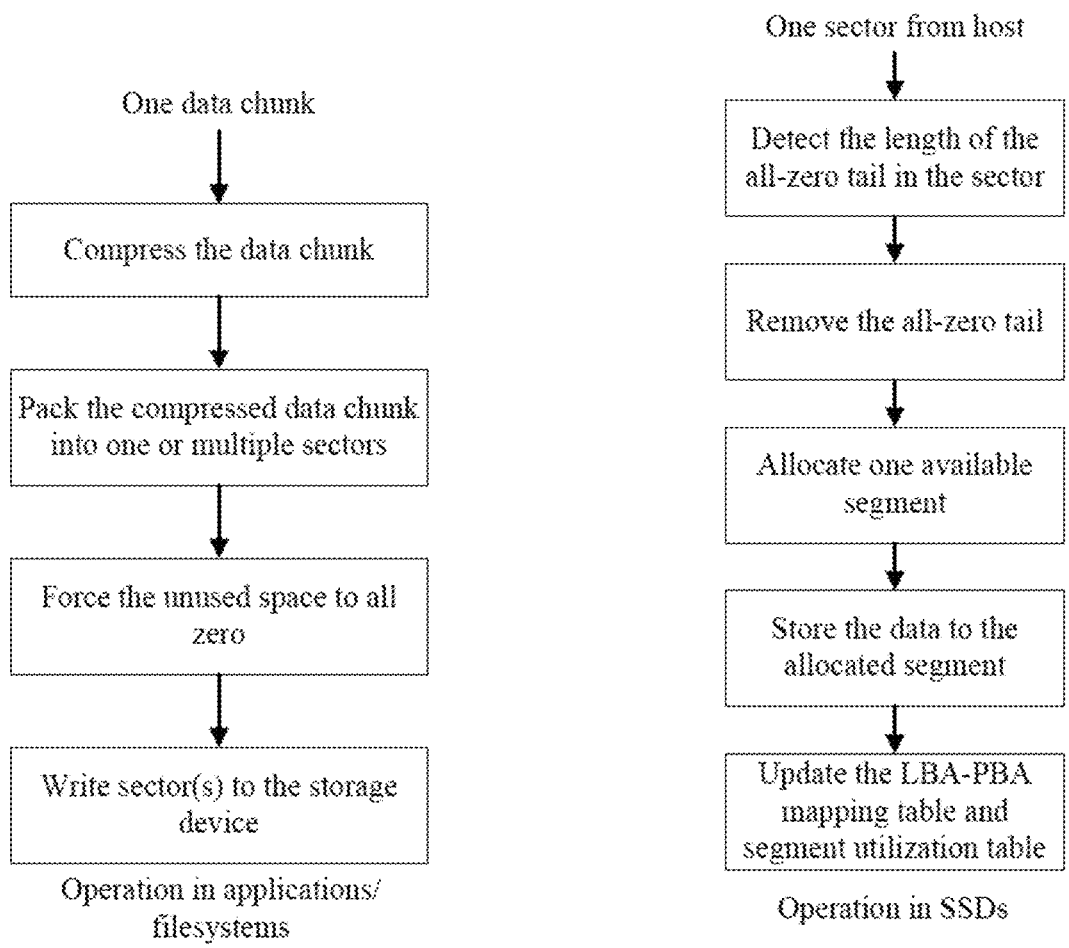
FIG. 8 illustrates the operational flow diagram of compressing and writing data to a storage device, in accordance with embodiments.

FIG. 8 illustrate the overall operational flow when writing (left flow) and reading (right flow) one sector to and from the storage device 16. As illustrated in the left hand side of FIG. 8, the application 24 on the host 14 carries out compression on each individual data chunk, and packs the compressed data chunk into one or multiple sectors. Unused space inside the one or multiple sectors are then forced to zero and the sectors are written to the storage device 16.

On the right hand side of FIG. 8, upon receiving each sector from the host 14, the storage device controller 24 internally determines if a sector has an all-zero tail using zero tail detection system 30, detects the length of its all-zero tail and locates an available segment. Then the controller 24 removes the all-zero tail from the sector and stores the remaining variable size data chunk in the allocated segment. Finally, the controller 24 updates the LBA-PBA mapping table 70 and the segment utilization table 72.

Figure 9:
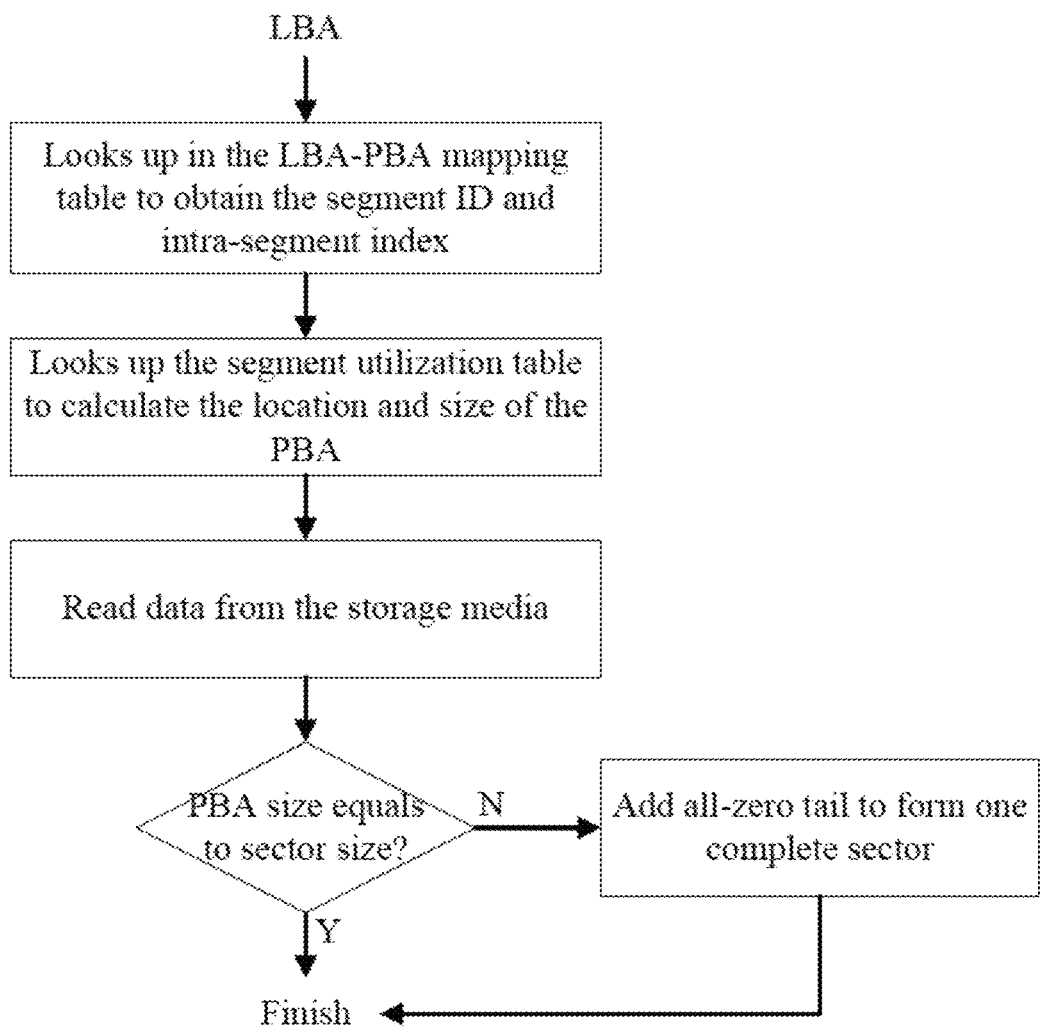
FIG. 9 illustrates the operational flow diagram of reading one sector from a storage device, in accordance with embodiments.

FIG. 9 depicts an illustrative process for implementing a read request at the storage device 16. In response to receiving a read request for an LBA of a sector, controller 24 (FIG. 4) performs a look-up in its LBA-PBA mapping table 70 to obtain the segment ID and intra-segment index associated with the LBA, and then accordingly looks up the segment utilization table 72 to calculate the location and size of the PBA. Then, the controller 24 reads the data associated with this PBA from the physical storage media. If the size of the PBA is less than the size of one sector, the controller 24 adds the all-zero tail to the data to form a complete sector.

Figure 10:
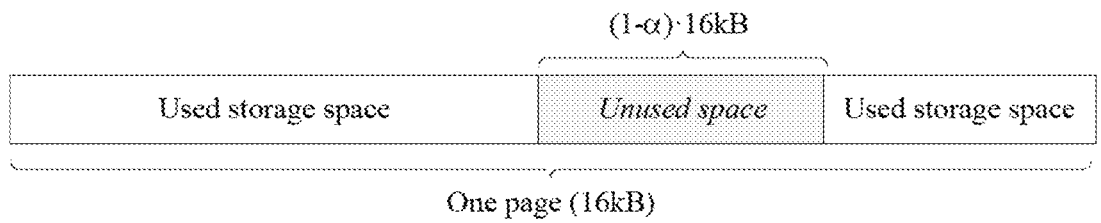
FIG. 10 illustrates how an application may keep a certain amount of unused space when creating a new page, in accordance with embodiments.

Due to the additional computational complexity and latency caused by data compression, some applications 24 may not always turn on compression even in the presence of good data compressibility, especially for latency-sensitive applications such as a database. In order to reduce the data storage management complexity, some applications (in particular most databases) typically manage data in units of pages (e.g., 8 kB or 16 kB per page) and do not fully fill each page. For example, the database MySQL by default manages data storage in the unit 16 kB page. Controlled by a parameter called fill-factor α (where 0<α≤1), as illustrated in FIG. 10, MySQL may fill up to α·16 kB when creating a new 16 kB page. By leaving some space unused, this will enable MySQL to directly insert new data items to the page in the future without complicating the data storage management. As illustrated in FIG. 10, the unused space within each page typically resides internally, i.e., in the middle such that the data structure can grow from both ends. Although a smaller value of the fill-factor α could reduce the data management complexity, it nevertheless causes higher storage space usage, especially when data compression is not being used.

Figure 11:
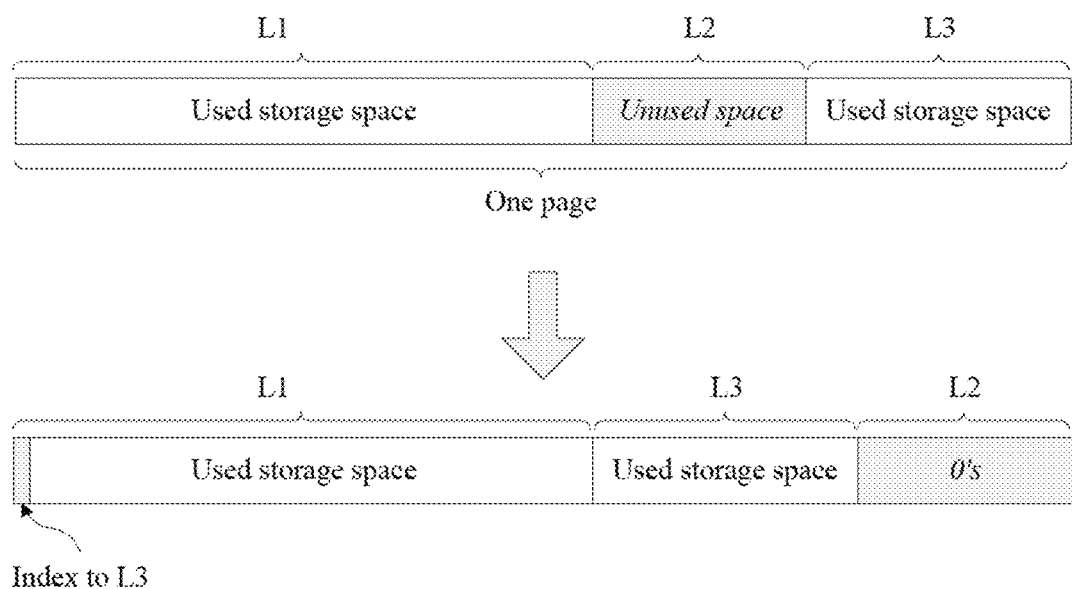
FIG. 11 illustrates a technique that forces the unused space within one page as all-zero and moves it to the tail of the page, in accordance with embodiments.

To reduce the physical storage space usage, especially in the case of a small fill factor, a page swapping system 22 (FIG. 4) may be deployed on the host 14. As illustrated by way of example in FIG. 11, the original page contains L1, L2, and L3, where L2 is the unused space in the page. Before writing the page to the storage device, page swapping system 22 first moves the unused space to the tail of the page, i.e., L2 and L3 are swapped within the page. In order to enable the reconstruction of the page when being read from the storage device 16, an index is added to the page head that contains the location and size information of L3. Once moved to the tail, the content inside L2 is forced to all zeros as described above. Once completed, the new page can be written to storage device 16, which can use the method described above to leverage the all-zero tail to improve the storage efficiency.

Note that while the describe approach uses zeros to identify and process unused space in a sector, ones or some other predefined pattern could likewise be utilized.

It is understood that the memory management system 18, zero tail detection system 30, and variable size mapping system 32 may be implemented in any manner, e.g., as a software program, firmware, hardware, an integrated circuit board, a controller card that includes a processing core, I/O and processing logic, etc. Different aspects may be implemented in hardware and/or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by hardware and/or computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage infrastructure, comprising:
   a data zero forcing system adapted to interact with an application running on a host, wherein the data zero forcing system causes an unused portion at a tail end of a data sector to be forced to all zeros before being written; and
   a storage device comprising solid state memory adapted to store and retrieve data written by the host, wherein the storage device includes:
   a zero tail detection system which, in response to receiving a write request for a data sector, detects and removes a tail end of zeros in the data sector to create a variable size data chunk, and allocates a segment for storing the variable size data chunk; and
   a variable size mapping system that includes: (1) a mapping table that maps a logical block address (LBA) of the variable size data chunk to a physical block address (PBA) entry, wherein the PBA entry includes a segment ID and an index; and (2) a segment utilization table which, for each of a plurality of segments, provides a size of each variable size data chunk stored in the segment.

2. The storage infrastructure of claim 1, further comprising a page swapping system adapted to interact with the application running on the host, wherein the page swapping system causes an internal unused section of a page to be swapped with a tail end used section of the page.

3. The storage infrastructure of claim 2, wherein the page swapping system inserts an index into the page to identify an original location of the unused section.

4. The storage infrastructure of claim 1, wherein the application comprises one of a file system or a database.

5. The storage infrastructure of claim 1, wherein the zero tail detection system operates in parallel on a data sector being stored in a data buffer on the storage device.

6. The storage infrastructure of claim 1, wherein in response to receiving a read request of an LBA at the storage device, a storage device controller:
- performs a look up into the mapping table to obtain the segment ID and index;
- performs a look up into the segment utilization table to determine a location and size of an associated data chunk; and
- if the associated data chunk is not equal to a sector size, adds an all-zero tail to complete the sector.

7. The storage infrastructure of claim 1, wherein ones are utilized instead of zeros for processing the tail end of an unused portion of a data sector.

8. A method of processing data in a storage infrastructure, comprising:
- in response to a request to write compressed data to a storage device from an application running on a host, packaging the compressed data into a set of sectors;
- determining if there exists an unused portion at a tail end of a sector;
- in response to a detection of an unused portion at the tail end of a sector, forcing the unused portion to all zeros;
- receiving at a storage device the set of sectors;
- examining each sector to detect if a tail end of zeros exists;
- if a tail end of zeros exists, removing the zeros create a variable size data chunk;
- allocating a segment for storing the variable size data chunk; and
- updating a mapping table that maps a logical block address (LBA) of the variable size data chunk to a physical block address (PBA) entry, wherein the PBA entry includes a segment ID and an index; and
- updating a segment utilization table which, for each of a plurality of segments, provides a size of each variable size data chunk stored in the segment.

9. The method of claim 8, further comprising swapping an internal unused section of a page with a tail end used section of the page on host.

10. The method of claim 9, wherein the swapping inserts an index into the page to identify an original location of the unused section.

11. The method of claim 8, wherein the application comprises one of a file system or a database.

12. The method of claim 8, wherein detecting whether the tail end of zeros exists occurs in parallel with the data sector being stored in a data buffer on the storage device.

13. The method of claim 8, further comprising, in response to receiving a read request of an LBA at the storage device:
- performing a look up into the mapping table to obtain the segment ID and index;
- performing a look up into the segment utilization table to determine a location and size of an associated data chunk; and
- if the associated data chunk is not equal to a sector size, adding an all-zero tail to complete the sector.

14. The method of claim 8, wherein ones are utilized instead of zeros for processing the tail end of an unused portion of a data sector.

15. A data storage device comprising:
- a solid state memory that stores data in segments; and
- a controller that manages read and write request from a host, wherein the controller includes:
  - a zero tail detection system which, in response to receiving a write request for a data sector, detects and removes a tail end of zeros in the data sector to create a variable size data chunk, and allocates a segment for storing the variable size data chunk; and
  - a variable size mapping system that includes: (1) a mapping table that maps a logical block address (LBA) of the variable size data chunk to a physical block address (PBA) entry, wherein the PBA entry includes a segment ID and an index; and (2) a segment utilization table which, for each of a plurality of segments, provides a size of each variable size data chunk stored in the segment.

16. The storage device of claim 15, wherein the zero tail detection system operates in parallel on a data sector being stored in a data buffer.

17. The storage device of claim 15, wherein in response to receiving a read request of an LBA at the storage device, a storage device controller:
- performs a look up into the mapping table to obtain the segment ID and index;
- performs a look up into the segment utilization table to determine a location and size of an associated data chunk; and
- if the associated data chunk is not equal to a sector size, adds an all-zero tail to complete the sector.

18. The storage device of claim 15, wherein ones are utilized instead of zeros for processing the tail end of an unused portion of a data sector.

19. The storage device of claim 15, wherein the zero tail detection system includes an OR gate, a binary counter, and a multiplier.

20. The storage device of claim 15, wherein variable size data chunk is stored with at least one previously generated variable size data chunk in a common segment.

* * * * *